Patented Sept. 3, 1929.

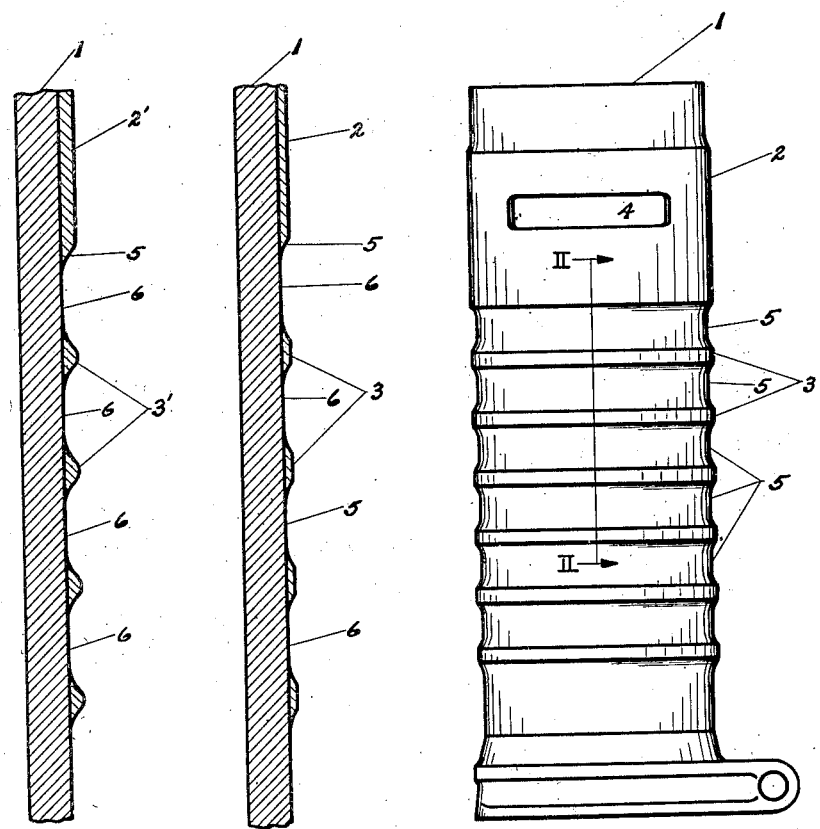

1,727,302

UNITED STATES PATENT OFFICE.

HENRY J. EDWARDS, OF TOLEDO, OHIO, ASSIGNOR TO THE WILLYS-OVERLAND COMPANY, OF TOLEDO, OHIO, A CORPORATION OF OHIO.

METHOD OF COATING VALVE SLEEVES.

Original application filed December 21, 1925, Serial No. 76,688. Divided and this application filed June 21, 1928. Serial No. 287,313.

This invention is a division of my co-pending application, Serial Number 76,688, filed December 21, 1925, relating to metal-coated structures, and more particularly to metal-coated valve sleeves for internal combustion engines.

One of the objects of the invention is to provide for an internal combustion engine, a sleeve that is composed of a structurally strong body portion and a bearing portion composed of a low friction material.

Another object of the invention is to provide a metal-coated valve sleeve having a unit-like bond between the sleeve and metal coating.

Another object of the invention is to provide a metal-covered valve-sleeve of low cost.

Another object of the invention is to provide a valve-sleeve on which the machining operations are of small number.

A further object of the invention is to provide a method of coating a ferrous valve-sleeve formed of suitable metal, as for instance steel, with a low friction material, as for instance a non-ferrous metal, in such manner as to form oil grooves on the surface of the sleeve.

Other objects relating to details of construction and economies of manufacture, will appear from the description to follow, covering certain embodiments of the invention, which for the purpose of the present application I have illustrated in the accompanying drawing, in which:

Figure I is a side elevation of a finished valve-sleeve constructed according to the invention.

Fig. II is an enlarged sectional view of a portion of the sleeve wall, the section being taken substantially on line II—II of Fig. I.

Fig. III is an enlarged sectional view of a similar portion of a sleeve showing the lands before the final machining operation.

Valve sleeves for internal combustion engines are frequently made of steel in order to reduce their weight, and when so made, the usual practice is to coat the sleeves with a non-ferrous bearing metal as, for instance, Babbitt metal or bronze. The purpose of the non-ferrous metal is to reduce the friction of the movable sleeve, and to further this purpose, oil distributing grooves are machined in the outer surface of the finished sleeve. The present invention eliminates the machining of the oil grooves, by depositing the metal forming the low-friction coating from a fluid state onto the sleeve proper, in the form of circumferential lands which are preferably annular and separated one from the other, by grooves in which little or no metal is deposited.

In carrying out the invention, I employ a valve-sleeve 1 preferably of ferrous metal, upon which are deposited low friction, preferably non-ferrous metal, lands 2 and 3. Land 2 should be wide enough to provide considerable unbroken surface both above and below port 4, as the surface around the port 4 is subjected to high gas pressures and it is desirable to prevent gas leakage between the sleeve and its mating surface (not shown). Lands 3 may be much narrower, as their purpose is to guide the sleeve within the cylinder (not shown) and retain a supply of suitable lubricant in the intervening grooves 5. The deposition of the non-ferrous metal composing lands 2 and 3 is preferably accomplished by a process which consists of blowing a spray of molten metal by a torch onto the surface 6 of the sleeve 1. I prefer to roughen the surface of the sleeve by any suitable means preparatory to the spraying operation but the necessity for so doing will depend upon the character of the surface of the unfinished sleeve. Formerly the low friction metal was applied so as to form a coating of substantially uniform thickness throughout the extent of the surface. The present invention consists in a deviation from this former practice in that great care is taken to deposit the metal unequally over the surface, preferably in the form of circumferential lands, having grooves of appreciable width between them. The procedure preferably followed in producing my improved sleeve is to machine the steel sleeve 1 with a slightly roughened surface 6; mount it in any suitable rotating device (not shown) and to revolve it adjacent the nozzle of a metal spraying machine (not shown) such as has been referred to herein. The directing of the molten metal from the spray to the revolving sleeve may be accomplished either by using a number of spray nozzles, each one directed toward a spot on sleeve 1, at which it is desired to deposit a land 2 or 3, or by using a single movable nozzle. If the movable nozzle is used its travel parallel to the axis of the rotating sleeve should be intermittent and rapid, the time interval between travels governing the depth of the metal deposit. The non-ferrous lands 3 should be built up to a slightly greater diameter than the desired diameter of the sleeve, and will have a rounded appearance as indicated in Fig. III. The final operation consists in machining or grinding the lands to the desired finished diameter, after which the lands 2 and 3 will have true cylindrical surfaces with intermediate oil grooves as indicated in Figs. I and II.

It may be readily seen from the foregoing description that I have provided a metal-coated valve-sleeve and a method for making the same, in which both the metal and depositing operations and the machine operations are very much reduced over those existing prior to my invention and that the cost of manufacture is proportionately lessened.

While I have illustrated and described somewhat in detail, certain embodiments of my invention, it is to be understood that this showing and description are illustrative only, and that I do not regard the invention as limited to details of construction illustrated and described, except in so far as I have included such limitations within the terms of the following claims, in which it is my intention to claim all novelty inherent in the invention, broadly as well as specifically.

I claim:

1. The method of coating a metallic sleeve with a metal, which comprises rotating the sleeve to be coated, and spraying molten metal thereon, said spraying being directed against spaced portions of said sleeve so that annular deposits are formed thereon.

2. The method of coating a metallic sleeve with a metal, which comprises rotating the sleeve and spraying the molten metal thereon at spaced intervals extending longitudinally of the axis of said rotating sleeve.

3. The method of forming a valve-sleeve for an internal combustion engine, which comprises forming a sleeve with a smaller diameter than the finished valve-sleeve, and spraying molten metal on said sleeve in the form of circumferential lands.

4. The method of forming a valve-sleeve for an internal combustion engine, which comprises forming a sleeve with a diameter smaller than the finished valve-sleeve, spraying molten metal on said sleeve in the form of circumferential lands of greater outside diameter than the finished valve-sleeve, and subsequently machining the lands to the desired diameter.

5. The method of forming a sleeve with circumferential depressions, which comprises spraying molten metal onto the surface of said sleeve in the form of spaced circumferential ridges, and subsequently machining said ridges to a finished diameter of a greater dimension than the diameter of the depressions.

6. The method of forming a sleeve with external annular grooves, which comprises rotating the sleeve, spraying molten metal upon said sleeve at spaced intervals extending longitudinally of the axis of rotation so as to form annular projecting lands, and subsequently machining the outside of said lands.

7. The method of coating a valve-sleeve for an internal combustion engine, which comprises rotating a sleeve having a smaller diameter than the finished valve-sleeve, and directing a spray of molten metal onto said rotating sleeve in a manner to form spaced circumferential lands on said valve-sleeve.

8. The method of forming a valve-sleeve for an internal combustion engine which comprises forming a sleeve of smaller diameter than the finished valve-sleeve with a roughened surface, applying non-friction metal in the form of circumferential lands of greater outside diameter than the finished valve-sleeve to the roughened surface, and subsequently machining the lands to the desired diameter.

In testimony whereof, I affix my signature.

HENRY J. EDWARDS.